June 30, 1953 | J. W. DUNN | 2,643,712

VENETIAN BLIND

Filed June 24, 1946 | 5 Sheets-Sheet 1

INVENTOR.

John W. Dunn

BY Robb & Robb

Attorneys

June 30, 1953 J. W. DUNN 2,643,712

VENETIAN BLIND

Filed June 24, 1946 5 Sheets-Sheet 2

INVENTOR.
John W. Dunn
BY Robb & Robb
Attorneys

June 30, 1953 J. W. DUNN 2,643,712

VENETIAN BLIND

Filed June 24, 1946 5 Sheets-Sheet 3

INVENTOR.
John W. Dunn
BY Robb & Robb
ATTORNEY

VENETIAN BLIND

INVENTOR.
John W. Dunn
BY Robb & Robb
Attorneys

June 30, 1953 J. W. DUNN 2,643,712

VENETIAN BLIND

Filed June 24, 1946 5 Sheets-Sheet 5

INVENTOR
John W. Dunn
BY Robb & Robb
ATTORNEYS

Patented June 30, 1953

2,643,712

UNITED STATES PATENT OFFICE 2,643,712

VENETIAN BLIND

John W. Dunn, Alhambra, Calif., assignor to Cal-Alloy Castings, Inc., Glendale, Calif., a corporation Application June 24, 1946, Serial No. 678,828

3 Claims. (Cl. 160—167)

My present invention comprises a novel construction of Venetian blind, and involves in one phase a new combination of bodily shiftable blind unit, and hold down bracket means cooperative therewith.

My newly invented hold down means is designed especially to work in conjunction with the new type of blind which is disclosed in my United States Patent No. 2,413,754, issued January 7, 1947, and my copending application for patent, Serial No. 641,528, filed January 16, 1946, now Patent No. 2,493,234, issued January 3, 1950, because it is particularly adapted to function with a blind bottom rail that is shifted inwardly and outwardly relative to the window, incident to the tilting adjustment of the slats of the blind to opposite inclinations, or to horizontal positions.

My hold down means as above referred to, however, is useful in connection with Venetian blinds of the common types now in use, in which the blind does not shift bodily, because many of the advantages of the hold down means may be availed of for ordinary blinds in which axis of the upper tilt bar of the blind is fixed, or does not shift inwardly or outwardly.

Therefore, my invention also involves a novel construction of hold down bracket means per se, or a unit of itself which may be vended for use separately from the blind, if desired, or with conventional forms of such blinds.

A special feature of my invention resides in the construction of the parts of my hold down means such that they will act with automatic locking effects initiated by closing movements of the blind slats, and assume positions enabling release of the lower end (hold down rail) of the blind when the latter assumes a horizontal or nearly horizontal position.

Still another object of my invention has been to produce hold down means in the form of simple members, readily adapted to be die cast, or otherwise easily produced, and constituting separate hardware parts easily to be attached to a blind hold down rail and to the lower portion of the windows, door, or other like member upon which the blind is mounted.

With the foregoing in view, a full understanding of my invention will be had upon reference to the following detail description, in connection with the accompanying drawings, and in the latter:

Hereinafter, my invention will be described in connection with the construction of blind of my above identified application, and the universality of the usefulness of the hold down means will be evident from such disclosure.

Figure 1:
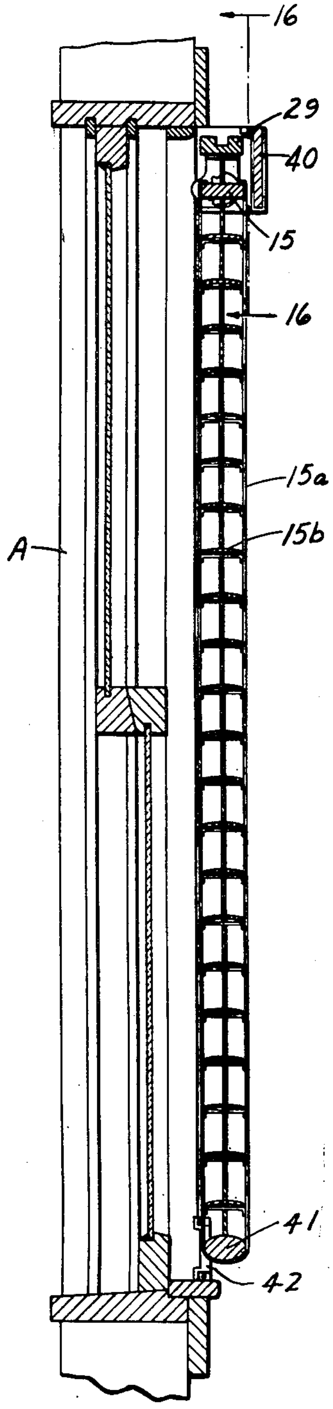
Figure 1 is a vertical sectional view of a window frame having my blind unit as shown in operative position thereon with the slats open.
Figure 2:
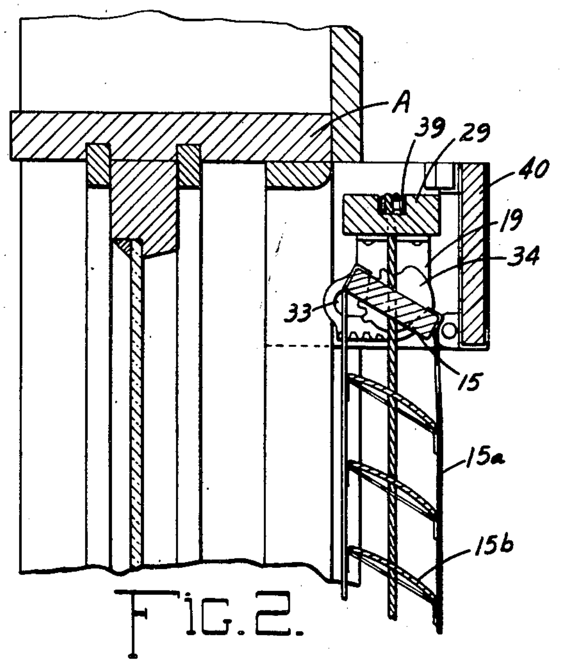
Figure 2 is an enlarged sectional view of the upper portion of the window frame showing the upper end of the blind unit with the hardware parts for supporting the same, the slats of the unit being shown open.
Figure 3:
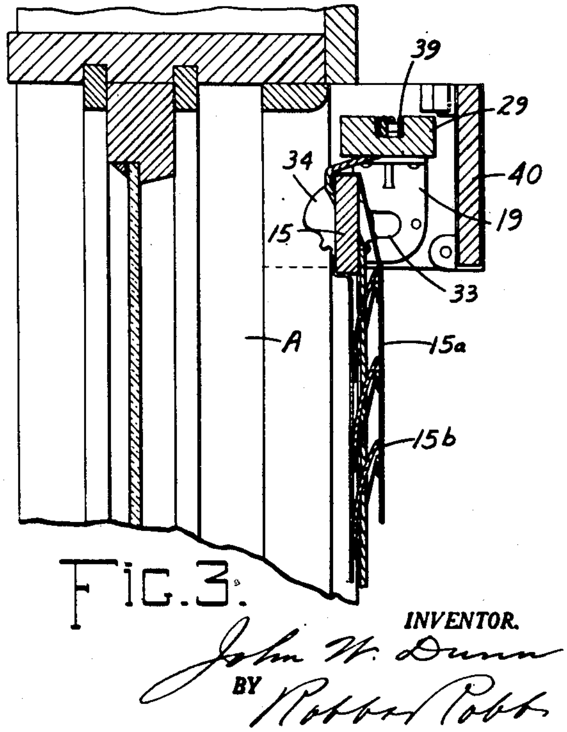
Figure 3 is a view similar to Figure 2, but illustrating the tilt bar so tilted as to effect a closing action of the slats of the blind, the tilt bar being shown in its outermost position of extreme movement toward the window frame, eliminating any vision openings at the vertical edges of the blind and between it and the sides of the frame.
Figure 4:
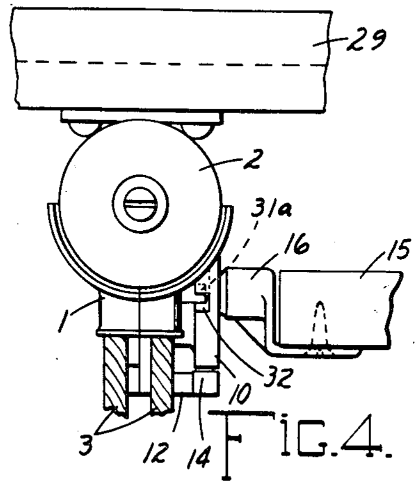
Figure 4 is a fragmentary view in front elevation showing the blind tilter unit as carried by the head rail usually secured to the top of the window frame, and a portion of the tilt bar which is supported by the tiling unit.
Figure 16:
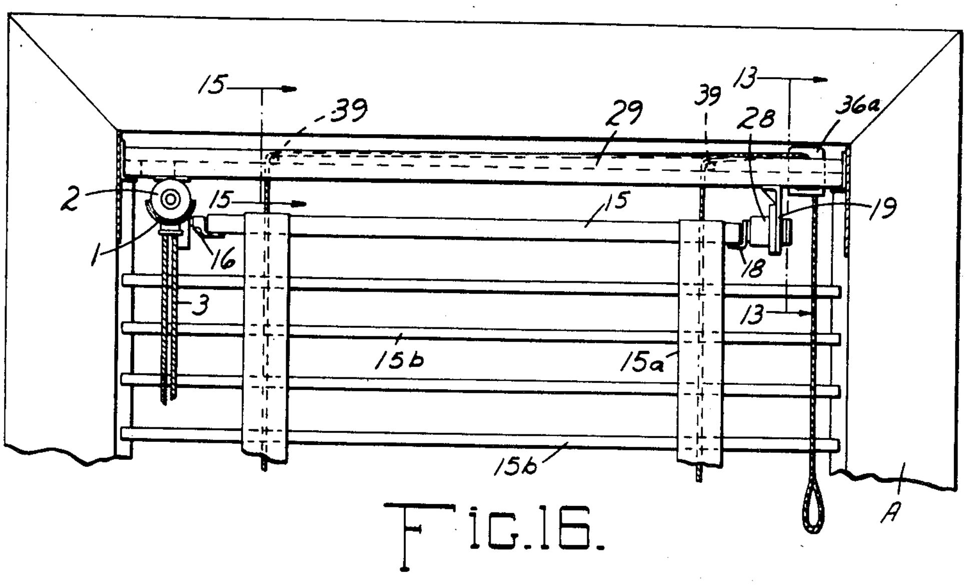
Figure 16 is a fragmentary partial front elevation of the upper portion of a window equipped with the blind unit and operating and supporting parts of my invention.

Proceeding to describe the detail features of my invention, and method of applying the same to a Venetian blind of generally conventional form, reference is first made to Figures 1 to 3 inclusive, and Figure 16. As seen in Figure 16, at the left side of the frame of the window, looking at the said frame from the inside of the house or dwelling or other building on which the window is carried, is located the tilting unit. This unit may be located on the left or right side of the window frame since this makes no difference.

Figure 7:
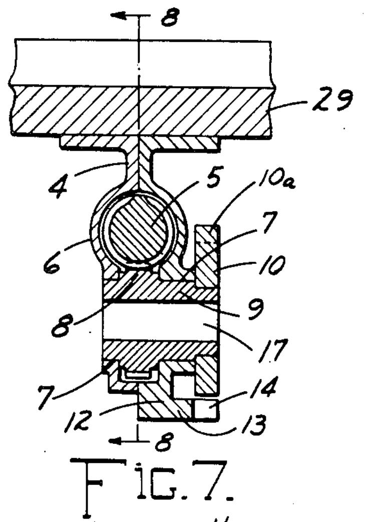
Figure 7 is a vertical sectional view taken about on the line 7—7 of Figure 5.
Figure 8:
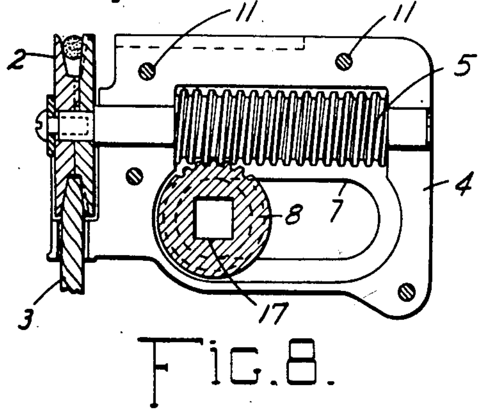
Figure 8 is a vertical sectional view taken about on the line 8—8 of Figure 7.

As seen in Figures 7 and 8, and Figure 16 particularly, the tilting device comprises the usual worm shaft 1 carrying at its inner end the customary cord pulley 2 fixed to said shaft. The tilting cord 3 passes around the grooved portion of the pulley 2 and the operating ends of the cord 3 are pendent from the tilting unit in the customary way. The worm shaft 1, see Figures 7 and 8, is mounted in a bracket 4 and the worm 5 fixed on the shaft 1 is adapted to turn in the hollow portion of said bracket designated 6. Mounted in a suitable bearing portion 7 of the bracket 4 is the worm engaged pinion 8 which is provided with an offstanding trunnion portion designated 9 at the outer end of which is carried a travel gear or pinion member 10 fixed to turn with the gear 8.

The bracket 4 may be made in complemental sections for the purpose of facilitating die casting of the same, though the bracket may be formed, if desired, of stamped out parts held together in the same manner as the sections of the die cast parts, namely, by means of pins 11, see Figure 8. The larger diameter portion of the gear 8, previously called the worm pinion, is embraced between the sections of the bracket 4 so as to maintain the pinion 8 in proper location of operating position on the bracket, in a manner in which it cannot be displaced. The bearing portions 7 of the bracket 4, provided for the gear 8, are in the form of slotted portions at the lower ends of the two sections of the brackets, see Figures 7 and 8 as well as Figure 6. It is therefore possible, upon the turning of the worm 5 by the pulley 2 and shaft 1, for the gear 8 or worm pinion to travel along the worm 5 and longitudinally inwardly or outwardly of the slot bearings 7 above referred to. The travel pinion or gear member 10 is disposed exteriorly of the bracket means 4 at one side of the latter.

One of the complemental parts of the bracket 4, or sections, as previously referred to, the right one as seen in Figure 7, is formed at its lower edge portion with an extension 12, which extension is provided with a flange 13 having a rack composed of a series of teeth designated 14 formed at its outer edge.

The travel gear or pinion 10 is really a gear sector formed with a series of teeth 10a which are adapted to mesh or engage with the teeth 14 on the extension 12 at the lower portion of the bracket 4.

Figure 5:
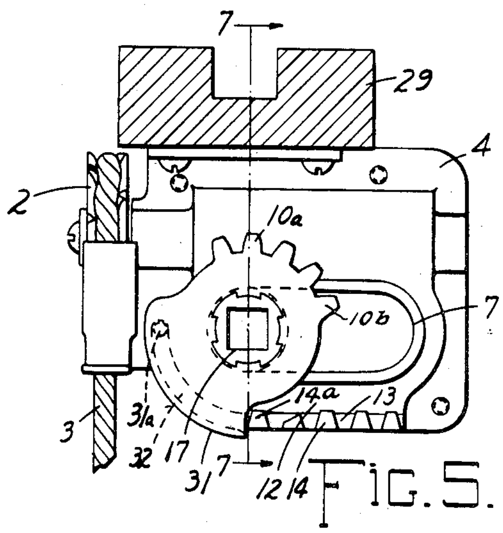
Figure 5 is a view in vertical section showing primarily the parts that are illustrated in Figure 4 but additionally showing more clearly the bracket means and the traveling pinion or gear members that support the tilt bar or pulley than in Figure 4.
Figure 6:
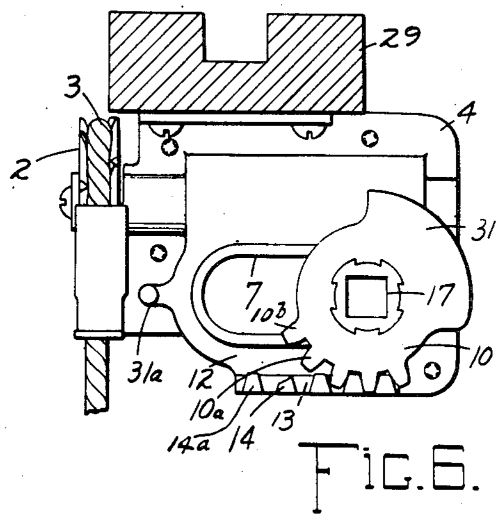
Figure 6 is a view similar to Figure 5, but illustrating the tilt bar supporting gear or pinion members in their outermost positions of movement as distinguished from Figure 5 that shows these parts with the tilt bar in the innermost position assumed thereby in the use of my invention.

From the foregoing construction it will be clear that as the worm pinion 8 is rotated by the worm 5, the travel pinion 10 would similarly be rotated because fixed to the member 8, and the turning of the pinion member 10 will cause it to travel along the rack provided by the teeth 14, as quite clearly depicted in the view Figures 5 and 6.

Figure 17:
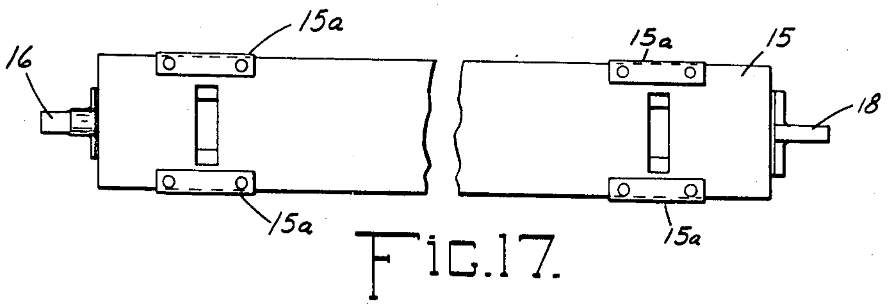
Figure 17 is a top plan view of the tilt bar showing the manner of attachment of the slat tapes thereto, and the formation of the pintle members at opposite ends of said bar.
Figure 18:
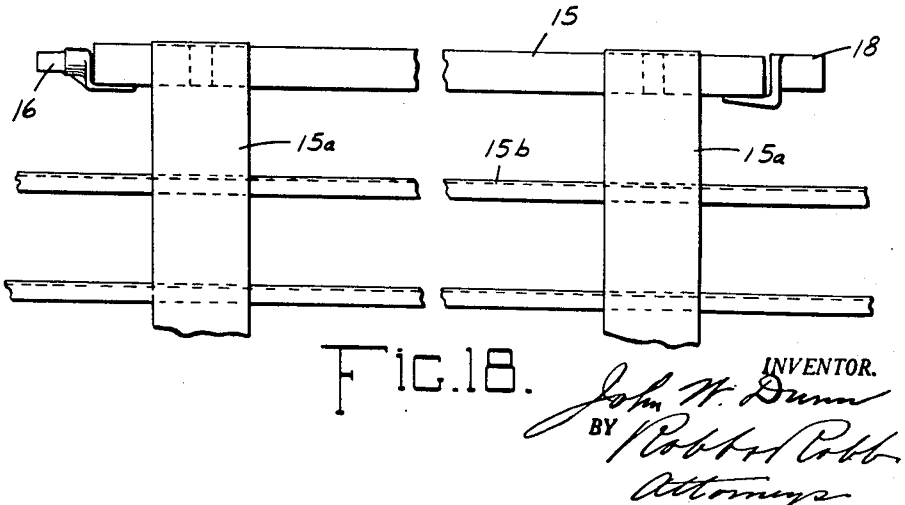
Figure 18 is a front elevation of the parts shown in Figure 17, and additionally showing a couple of the slats that are carried by the tapes attached to the tilt bar.

The worm tilting unit just described constitutes the support for one end of the tilt bar 15, which, as seen in Figures 17 and 18, is equipped at the said one end, the left end as viewed, with a square or poly-sided pintle member 16. The pintle member 16 is adapted to be interengaged with a square opening in the trunnion portion 9 of the worm pinion 8, which opening is designated 17.

Figure 10:
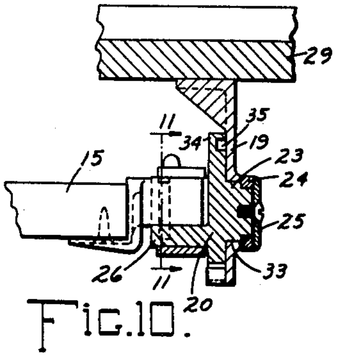
Figure 10 is a vertical sectional view, fragmentary in nature, taken about on the line 10—10 of Figure 9.
Figure 9:
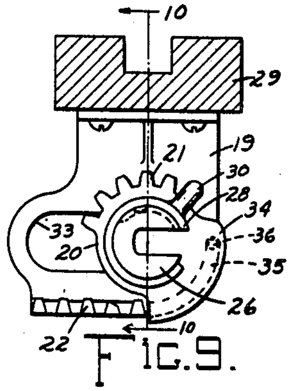
Figure 9 is a view of the bracket means and the follower pinion or gear member, showing more clearly the guide member provided on the gear or pinion member to coact with the stationary pin or projection on the side of the bracket.
Figure 11:
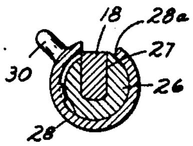
Figure 11 is a sectional view taken on the line 11—11 of Figure 10 and bringing out more clearly the means for detachably supporting one end of the tilt bar adjacent to the follower pinion or gear unit or member, the rectangular pintle member of the tilt bar being shown as when it may be readily raised and displaced from the socket on the follower pinion member.
Figure 12:
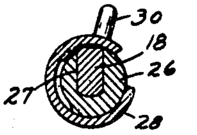
Figure 12 is a view similar to Figure 11 but showing the rotative keeper of Figure 11 turned into its locking position.

For supporting the other end of the tilt bar 15, the latter is equipped with a poly-sided pintle member 18 adapted to be mounted in a supporting bracket means such as shown in Figures 9 and 10 particularly, the same comprising a simple form of bracket 19 for carrying the travel pinion member 20 which is of a general construction somewhat similar to the travel pinion member 10 previously described, except that the follower travel pinion 20 is not provided with the connected gear 8 as is the pinion member 10, such gear not being necessary for my purposes. The pinion member 20, which will be called the follower pinion member because it follows the movement of the main and first described pinion 10, is provided with teeth of a sector of teeth, designated 21, and these teeth mesh with teeth 22 providing a rack at the lower edge of the bracket 19 below the bearing portion of the pinion member 20. The pinion member 20 has a trunnion or hub portion 23 which is mounted in a suitable bearing opening in the lower portion of the bracket 19, and held from displacement by means of a washer 24 and attachment plate 25. Projecting from the side of the pinion member 20 opposite the hub or trunnion portion 23 is a tilt bar supporting member in the form of a circular projection 26 which is provided with an elongated slot 27. The slot 27 is shaped to conform with the shape of the right hand pintle member 18 of the tilt bar 15, and since the slot is opened to one portion of the periphery of the projection 26, the pintle member 18 may be inserted or removed from the slot 27 at will. For locking the pintle member 18 in the slot 27, however, I utilize a keeper or lock member 28 of somewhat circular form interrupted at a portion of its periphery as seen at 28*a* in Figure 11, so that the interrupted portion may be brought to register with the outer edge portion of the pintle member 18, whereupon the pintle member 18 may be displaced from the projection 26, enabling removal of the tilt bar 15 and the supported slat and tape portions of the blind unit bodily from engagement with the members 10 and 26, or 20, referring to the follower pinion member. That is to say, when it is desired to detach the Venetian blind unit comprising the tilt bar, slats, and tape, from the supporting bracket means carried by the head rail designated 29, a finger-piece 30 on the keeper 28 will enable manipulation of the latter from the position of Figure 12 to that of Figure 11, and the tilt bar 15 may be detached by first raising the pintle member 18 out of the slot 27, and thereafter pulling the tilt bar 15 in the direction of the bracket 19 to disengage its square pintle member 16 from the square opening in the pinion member 10, said opening designated 17.

Describing another feature of the pinion member 10, it is notable as seen in Figures 5 and 6, that this member 10 is equipped with an arcuate or sector shaped guide member 31 formed with an arc-shaped guide groove 32 at one side thereof. Thus, when the pinion member 10 is rotated by the pulley 2 and the tilt cord means 3, to cause that member to travel under the turning action of the gear 8, to the inner end of the slot bearing 7, if any further rotation of the member 10 is required, it will cause its guide slot 32 to engage with a pin 31*a* on one of the sections of the bracket 4, the adjacent section, and allow disengagement of the last tooth 10*b* of the member 10 from tooth 14*a* of the rack flange 13 previously described, and on reverse rotation of member 10 to assure that tooth 10*a* of member 10 reengages between rack teeth of rack flange 13, thus remeshing the teeth of member 10 with the said last teeth in the same positions as they were prior to disengagement.

The bearing 33 in the bracket 19 supplies for the hub or trunnion portion 23 of the follower pinion member 20 is an elongated slot bearing like the bearing 7 of the bracket means 4, so that when the pinion member 10 is turned by the gear 8 under the action of the pull cord means 3, and travel is imparted through the worm 5 to the gear 8 and the pinion member 10, a corresponding movement of the pinion member 20 in the bearing slot 33 will be effected, and in this manner the tilt bar 15 may be moved outwardly relatively to the window frame designated A, or inwardly therefrom, carrying the Venetian blind unit of the tapes and slats along with it in the same direction of movement. The pinion member 20 is equipped with a sector of arc-shape, 34, similar to the guide means 31 and 32, and formed with a corresponding arc-shaped guide slot 35 to coact with a pin 36, all likewise corresponding with the equivalent parts associated with the pinion member 10 and for the same purpose.

The operation of my Venetian blind means, largely comprising the unit made up of the tilt bar 15 and the tapes 15*a* and slats 15*b*, is practically the same, generally speaking, as in respect to the construction in my previously mentioned application, save that the operation is effected by newly designed parts advantageously arranged and improved upon in accordance with the disclosure herein.

When the Venetian blind is to be closed, it will be tilted by the bar 15 tilting the slats by action of the tapes in the manner shown in Figure 3, and as the blind is so closed it will be caused to move bodily including all of said parts 15, 15*a*, and 15*b*, outwardly toward the window frame A. Thereafter, a reverse movement of the tilting device for opening the blind and reversely tilting the slats will effect a bodily movement of the blind unit per se inwardly away from the frame A of the window.

Figure 13:
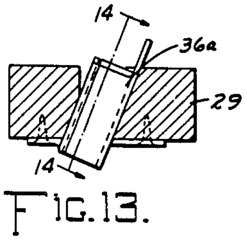
Figure 13 is a sectional view showing the cord guide member on the head rail, the view taken about on the line 13—13 of Figure 16.
Figure 14:
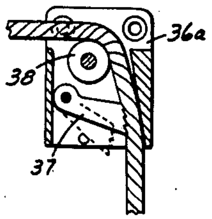
Figure 14 is a sectional view taken about on the line 14—14 of Figure 13.
Figure 15:
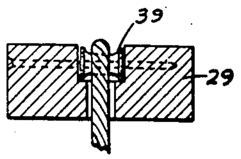
Figure 15 is a sectional view taken about on the line 15—15 of Figure 16, showing the mounting of one of the pulleys in the head rail, which pulley guides one of the blind raising cord members.

Figure 13 illustrates a cord lock and guide member 36*a* mounted on the head rail 29 for guiding one of the raising cords of the blind, and the details of this means are illustrated in Figure 14, including the cord locking member 37 and guiding pulley 38. In Figure 15, a sinlge guiding pulley for another of the raising cords, designated 39, is used. The parts of Figure 13, and Figures 14 and 15 are largely conventional.

It is apparent that initial rotation of the pinion members may cause them to travel in one direction along the slots of the brackets, and when they reach their outer limits of sliding movement they will rotate about a fixed axis, that of the tilt bar, due to action of the guide members 31 and 31*a*, and 35 and 36.

Figure 19:
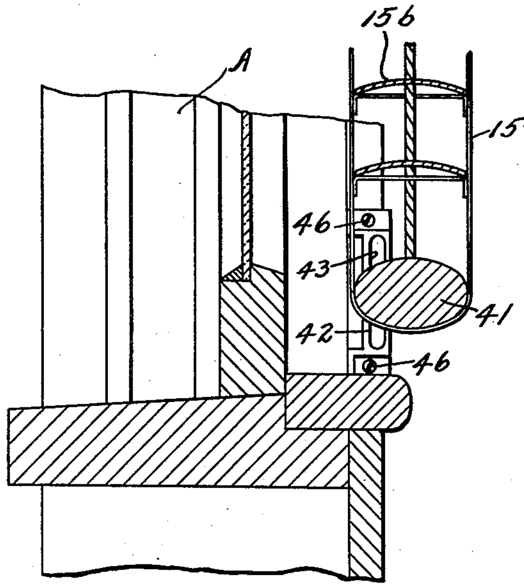
Figure 19 is an enlarged vertical sectional view as compared with Figure 1, of the blind hold down members and associated bottom portion of the blind, same broken away.
Figure 20:
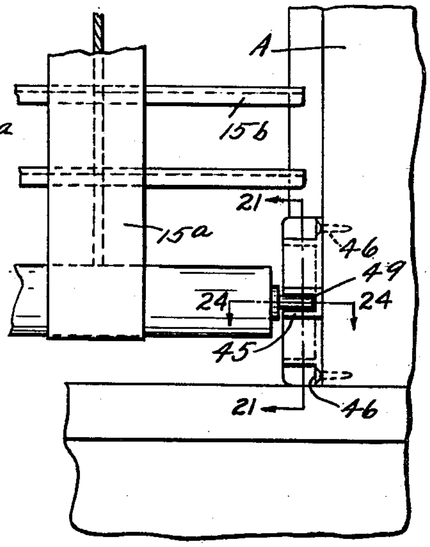
Figure 20 is a front view, broken away, looking toward the blind from its inner side, showing more of the parts of Figure 19.

Passing now to the hold down means of my present invention, this means primarily shown in Figure 1 and Figures 19 to 26 of my drawings. As seen in Figures 1, 19 and 20, the bottom rail of the blind is designated 41 and works in conjunction with hold down bracket means to be now set forth in detail.

The hold down rail 41 is, of course, located at the lower end of the blind slat unit. It is usually in the form of a cross bar or rail of rectangular cross section though in my construction as shown the cross section of the said rail is approximately elliptical.

My hold down means comprises parts attached to the end of the rail 41, and other parts, namely, brackets, which are secured in any suitable manner to opposite sides of the window frame adjacent to the lower extremity thereof at which the rail 41 will be disclosed when the hold down means is used to cooperate therewith.

Figure 25:
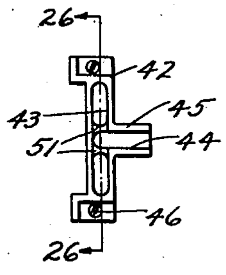
Figure 25 is a side elevation of one of the hold down brackets.
Figure 26:
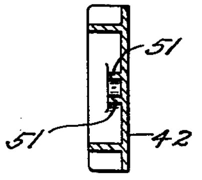
Figure 26 is a sectional view taken on the line 26—26 of Figure 25.

The said bracket plates are shown best in Figures 19, 20, and 25 and will be seen to comprise the plate 42 formed with T-shaped slots the vertical portions of which, designated 43, have the horizontal open portions which are designated 44, the latter being provided in horizontal inwardly projecting extensions 45 of the plate 42. The vertical and horizontal portions of the T-slot, of course, communicate with one another as shown clearly in Figure 25. Two of such plates 42 with their T-slots opposite to each other or opening towards each other and their extensions 45 projecting inwardly from the window frame are utilized for each blind, and they are attached to the window frame by suitable screws 46 or the like.

The bottom rail 41 is equipped at each end thereof with a hold down plate 47 secured to the rail by screws 48 or the like, and from each plate 47 project two pins, namely a rocker or hold down pin or gudgeon member 49, and a locking and shift pin 50, the pin 49 being almost twice the length of the pin 50.

The bottom rail 41 with its pins 49 and 50 at opposite ends is adapted to be interengaged with the bracket members 42 for relative horizontal movement of the rail 41 when in a horizontal position, with respect to the window frame A and with respect to the brackets 42, in other words, a rectilinear movement relatively to said brackets 42. The long rocker and hold down pins 49 are disposed at the central axis longitudinally of the bottom rail 41 by proper attachment of the plate 47 to said rail 41.

Now bearing in mind the operation of my Venetian blind as a whole, incidental to the shifting of the blind inwardly relatively to the window on the mounting means therefor incident to downward tilting of the slats of the blind, and outward movement bodily of the blind toward the outer side of the window incident to the upward tilting adjustment of the slats of the blind, the operation of my hold down means will be set forth.

Figure 21:
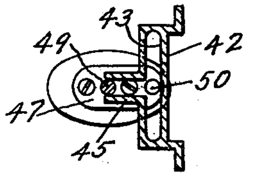
Figures 21, 22 and 23 are sections on the line 21—21 of Figure 20, showing different positions of the hold down rail and attached parts, also the stationary hold down bracket on one side of the window frame.

It being assumed that the blind parts are in the position of Figure 19 and the hold down parts are in the position shown in Figure 21, it will be evident that tilting of the blind slats downwardly and inwardly from the window by which action, or incident to which action, the entire blind unit is shifted inwardly, it will be seen that the bottom rail 41 will rock in the horizontal slot 44 of the bracket plates 42, with the long pins 49 acting as rocker or gudgeon pins. At the same time, the short lock and shift pins 50 will engage and move downwardly in the lower portions of the slots 43 and by such action the bottom rail 41 will be caused to move outwardly or toward the window in correspondence with the shifting of the upper end portion of the blind unit, in the same direction by means of the tilting devices which have first been described herein. It will be seen that when the pins 50 start to move into the portions of the vertical slots 43 below or above the horizontal slot portions 44 of the brackets 42 the action of these pins 50 is to cause the bodily shifting movement of the rail 41 inwardly or outwardly dependent upon the degree of movement of the pins toward and from the horizontal portions 44 of the T-slots of the members 42.

Figure 22:
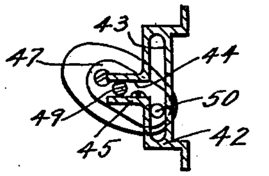
Figure 23:
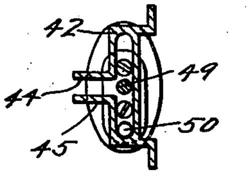
Figure 24:
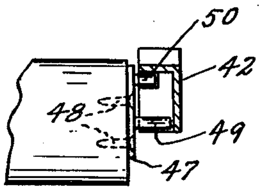
Figure 24 is a fragmentary sectional view on the line 24—24 of Figure 20.

In other words, noting Figures 22 and 23 particularly, as the bottom rail 41 is being tilted rightwardly about its axis, the pins 50 act on the left walls of the slot portions 43 to shift the rail to the right and according to Figure 23 the movement of the rail to the right as it is rotated in a clockwise direction is at the limit to which it may shift with the pin 50 working in the lower end portion of each adjacent slot 43 at its particular end of the rail 41.

It will be seen that if the direction of turning of the rail 41 is counter-clockwise as seen in Figures 1, 21, 22 and 23, the locking and shifting pin 50 will work in the upper portion of the slot 43 above the horizontal portion 44 and a similar effect as to the bodily shifting of the rail 41 will be produced as previously described. In other words, the action of the pins 49 and 50, the pins 49 primarily as rocker pins for the rail 41, and the pins 50 as shifting pins having a sort of cam action in the vertical portions 43 of the T-shaped slots is to in combination produce a floating movement of the rail 41 in conjunction with the somewhat similar movement which is produced by the tilter mechanism at the top of the blind unit, causing the inward and outward bodily movement of said unit.

It is notable that the primary function of the pins 49 is a hold down function but when these pins and the pins 50 are interengaged with the brackets 42, as by manual adjustment when the blind has been dropped to its lower limit of movement, if the blind slats and rail 41 were maintained in a horizontal position, wind from the exterior of the window would have a tendency to disengage the bottom rail 41 from the brackets 42. Therefore, in the use of my invention, after the bottom rail 41 has been properly engaged with the brackets 42 as seen in Figure 21, for instance, it is contemplated to slightly tilt the slats always, either upwardly or downwardly, whereby the lock and shifter pins 50 will move into the vertical portions 43 of the slots of brackets 42 and thereby obtain the desired locking effect to prevent disengagement of the bottom rail 41 from the brackets 42 and any movement inwardly from the window, of the lower portion of the blind as might be incident to that derived from inwardly moving air from the exterior of the dwelling.

The T-slots 43, 44 of brackets 42 are so designed as to permit sufficient end shift tolerance of the bottom rail 41 to allow for variance in window frames or normal measurement allowances. They are also designed for universal application to the window. The parts are interchangeable from one side of the window to the other and can be applied either between window jambs or on the face of the window casings or on the face of casement sash or doors.

Also it is noted as a specific construction of the brackets 41 that above and below the point where each of the long hold down pins 49 may move into the plane of the vertical portions 43 of the brackets 42 there are webs 51 to prevent the long pins from moving up or down in the vertical channels or slat portions 43 in cases where the blind might be stretched down tight or where the blind is slightly too long. If the center hold down pins 49 were allowed to move up or down in the vertical portions 43 of the slots this would lock the bottom rail at a vertical position so the web portions 51 are extended only a sufficient distance to permit the vertical travel of the shorter lock and shift pins thus to permit the vertical travel of the latter the full length of the vertical slot portions 43.

Now while the hold down bracket instrumentalities and pin features which I have described are designed especially to be used in conjunction with the floating or bodily movement type of Venetian blind first described herein, it is entirely possible to use my new hold down means in conjunction with conventional tilters for the blind unit as made today as such means will function equally well for the latter purpose, the difference being that with my new tilter mechanism at the top of the blind, the blind will move in toward the window when tilted, and will be held down by the hold down means described, whereas when my hold down means is employed with the conventional types of tilter now on the market only the bottom portion of the blind unit will move toward the window by the action of said novel hold down means. However, when using my new hold down devices as described with conventional blind tilters the result of tending to exclude the view and shut out the light for approximately the bottom half of the blind will be materially increased even though the blind would not hang in a strictly vertical position when tilted, the latter not however being a serious objection.

The insertion of the hold down and lock pins 49 and 50 into the portions 44 of the T-slots 43—44 can only be accomplished, and their removal from the brackets 42 effected, when the bottom rail 41 is within a few degrees of level or horizontal position.

Having thus described my invention, what I claim as new and desire to secure by Letters Patent of the United States, is:

1. In combination, a window or the like, a window frame, a Venetian blind comprising tiltable slats, supporting means for mounting the blind upon the window frame, and means for tilting the slats and simultaneously operating the blind to move it bodily relatively toward and away from the window, the blind comprising also a tiltable bottom rail, tiltable with the slats, and hold down means for the bottom rail comprising a pair of guide brackets, each bracket having a guide slot having a horizontally extending portion and a vertically extending portion, and a pair of hold down pins at each end of the bottom rail and receivable in the guide slot of a respective guide bracket, one pin of each pair being arranged on the tilting axis of bottom rail and slidable in the horizontally extending portion of its respective guide slot, the other pin of each pair being spaced from the first pin so as to be disposed inwardly of the guide slot relatively to the first pin and slidable in the vertically extending portion of its respective guide slot while the first pin is disposed in the horizontally extending portion of its respective guide slot.

2. In combination, a window or the like, a window frame, a Venetian blind comprising tiltable slats, supporting means for mounting the blind upon the window frame, and means for tilting the slats, the blind comprising also a tiltable bottom rail tiltable with the slats, and hold down means for the bottom rail comprising a pair of guide brackets, each bracket having a guide slot having a horizontally extending portion and a vertically extending portion, and a pair of hold down pins at each end of the bottom rail and receivable in the guide slot of a respective guide bracket, one pin of each pair being arranged on the tilting axis of the bottom rail and slidable in the horizontally extending portion of its respective guide slot, the other pin of each pair being spaced from the first pin so as to be disposed inwardly of the guide slot relatively to the first pin and slidable in the vertically extending portion of its respective guide slot while the first pin is disposed in the horizontally extending portion of its respective guide slot.

3. Hold down means for Venetian blinds, comprising a pair of guide brackekts attachable to a window frame, each bracket having a guide slot having a horizontally extending portion and a vertically extending portion, and a pair of end members attachable at each end of the bottom rail of a Venetian blind, each end member having a pair of hold-down pins receivable in the guide slot of the respective guide bracket, one pin of each pair being adapted to be arranged on the tilting axis of the bottom rail and slidable in the horizontally extending portion of its respective guide slot, the other pin of each pair being spaced from the first mentioned pin so as to be disposed inwardly of the guide slot relatively to the first pin and slidable in the vertically extending portion of its respective guide slot while the first pin is disposed in the horizontally extending portion thereof when the pins are cooperatively associated with the guide brackets as aforesaid.

JOHN W. DUNN.

References Cited in the file of this patent

UNITED STATES PATENTS

| Number | Name | Date |
|---|---|---|
| 2,017,541 | Kuyper | Oct. 15, 1935 |
| 2,298,892 | Lorentzen | Oct. 13, 1942 |
| 2,322,612 | Wright | June 22, 1943 |
| 2,413,754 | Dunn | June 7, 1947 |